United States Patent [19]  
Jodoin

[11] 3,913,304  
[45] Oct. 21, 1975

[54] TREE TRIMMER

[76] Inventor: Paul Jodoin, St-Jean Baptiste, Comte de Rouville, Quebec, Canada

[22] Filed: Apr. 29, 1974

[21] Appl. No.: 465,336

[52] U.S. Cl. ................................................ 56/235
[51] Int. Cl.² ........................................ A01D 55/18
[58] Field of Search ............ 56/233, 234, 235, 238; 144/2 Z, 3 D, 24, 236, 237

[56] References Cited
UNITED STATES PATENTS

| | | | |
|---|---|---|---|
| 3,214,895 | 11/1965 | Leydig et al. | 56/235 |
| 3,330,068 | 7/1967 | Carson | 56/235 |

*Primary Examiner*—Warner H. Camp

[57] ABSTRACT

A tree trimmer has a stationary upright support arm and a cutter arm mounted, at one end, to the support arm for rotation about a vertical axis so that in one complete revolution, it can give a tree a desired outer shape. The support arm, which is stationary in operation, has an upright section and a bent section, which follows the upright section and which has a length such that its outer end reaches out to the top center of the tree to be trimmed. The cutter arm has an upper end that is mounted to the outer end of the support arm through a vertical rotary stub shaft so that the cutter arm may rotate about a vertical axis, the said cutter arm having a shape, from its upper end, that corresponds to the outer linear contour to be given the tree from the top center down to the lower lateral edge. Rotary cutters are provided along the cutter arm to chip limbs of the tree that project past the desired linear contour to be applied to the tree.

8 Claims, 8 Drawing Figures

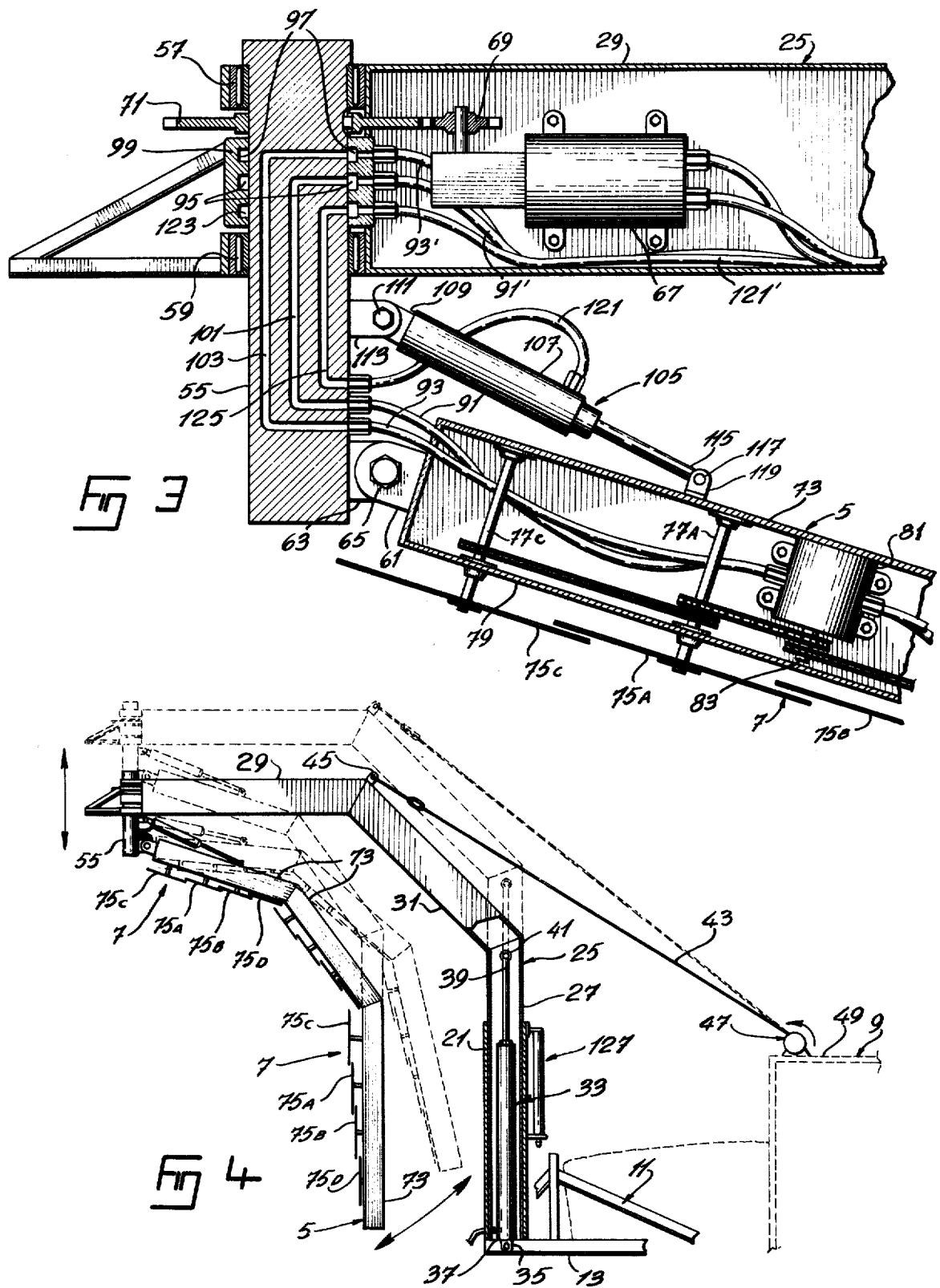

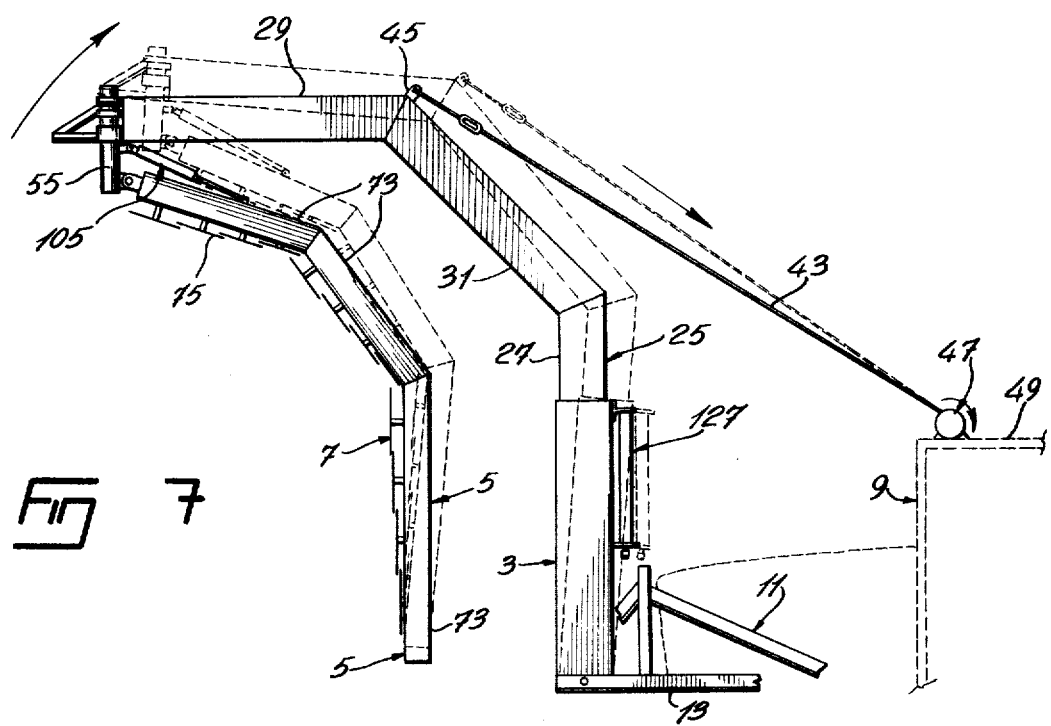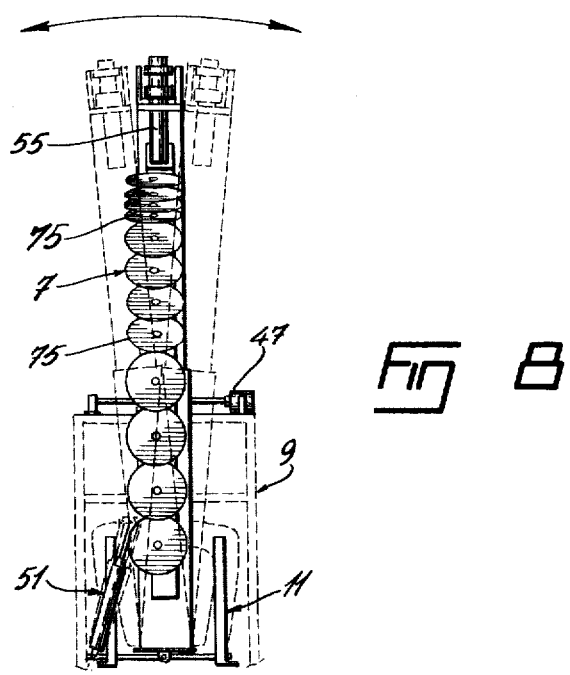

TREE TRIMMER

This invention relates to an improved device for trimming trees, schrubs, bushes and the like.

Trimming trees, or the like, manually, to desired shape is a very arduous and time consuming operation. It is a major expense for orchard operators.

It has been proposed to employ mechanically operated trimming devices to reduce the manual labor involved. Examples of such tree and shrub trimming devices are shown in Canadian Patent No. 923,021, issued Mar. 20, 1973, M. C. Fossum inventor, and U.S. Pat. No. 3,487,614, issued Jan. 6, 1970, E. Uhor inventor. None of devices known however can rapidly trim trees or the like to a desired shape in one quick operation. Several passes, with different cutter arm settings are required by the trimmer shown in the above Canadian Patent, for example. Again, many passes are required by any of the cutters shown in the above U.S. Patent.

The present invention provides a tree trimmer which can trim a tree, or the like, in one rapid operation. Only a single pass of the cutting means is normally required to trim a tree to the desired shape. This single pass consists of making one revolution with the cutting means, about a substantially vertical axis corresponding substantially to the vertical axis of the tree to be trimmed. The cutting means is shaped to generate a desired tree shape when rotated about the vertical axis.

The cutting means is preferably carried by suitable support means mounted on a farm tractor. The tractor is used to manoeuver the cutter means into the approximate position required for trimming a tree. Means are provided for making height, level, and size adjustments of the cutting means. The power for operating the device can be derived from the tractor in a well-known manner.

More specifically, the invention is directed toward a tree trimmer comprising: a support arm, stationary in operation of the trimmer, having a generally upright section and a bent section extending away from the upright section so that its outer end is capable of reaching the top center of the tree to be trimmed; a rotary cutter arm having an upper end which, in operation of the trimmer, stands at the said top center; this cutter arm having a shape, from the upper end, corresponding to the outer linear contour to be given the tree from the said top center down to its lower lateral edge; means is provided to mount the upper end of the cutter arm to the outer end of the support arm for rotation about a vertical axis extending transversely of the cutter arm; further means being provided to hold the cutter arm, with respect to the support arm, in a position wherein it follows the linear contour aforesaid, and the cutter arm has, therealong, cutting means to chip limbs of the tree that project past the aforesaid linear contour.

In a preferred embodiment of the invention, the cutter arm is mounted on the support arm by means of a vertical stub shaft and the upper end of the cutter arm is fixed to the stub shaft by pivot means allowing pivotal movement about a vertical axis. In this embodiment, the stub shaft is mounted on the support arm for rotation by means of a motor provided in the support arm.

Still preferably, the cutter arm is held in position with respect to the support arm by means of a length-adjustable jack connected respectively to the cutter arm and to the stub shaft to cause, when actuated, pivoting of the cutter arm.

Other features of the invention will become apparent from the following description of a preferred embodiment thereof having reference to the appended drawings wherein:

FIG. 3 is a detail cross-sectional view showing the manner of connecting the cutter arm to the support arm;

FIG. 4 is a side elevation view of the tree trimmer, in partial section, showing different positional adjustments of the cutter arm;

FIG. 7 is another side elevation of the tree trimmer, showing different positional adjustments which can be made; and FIG. 8 is a front elevation view of the tree trimmer showing further positional adjustments.

Figure 1:
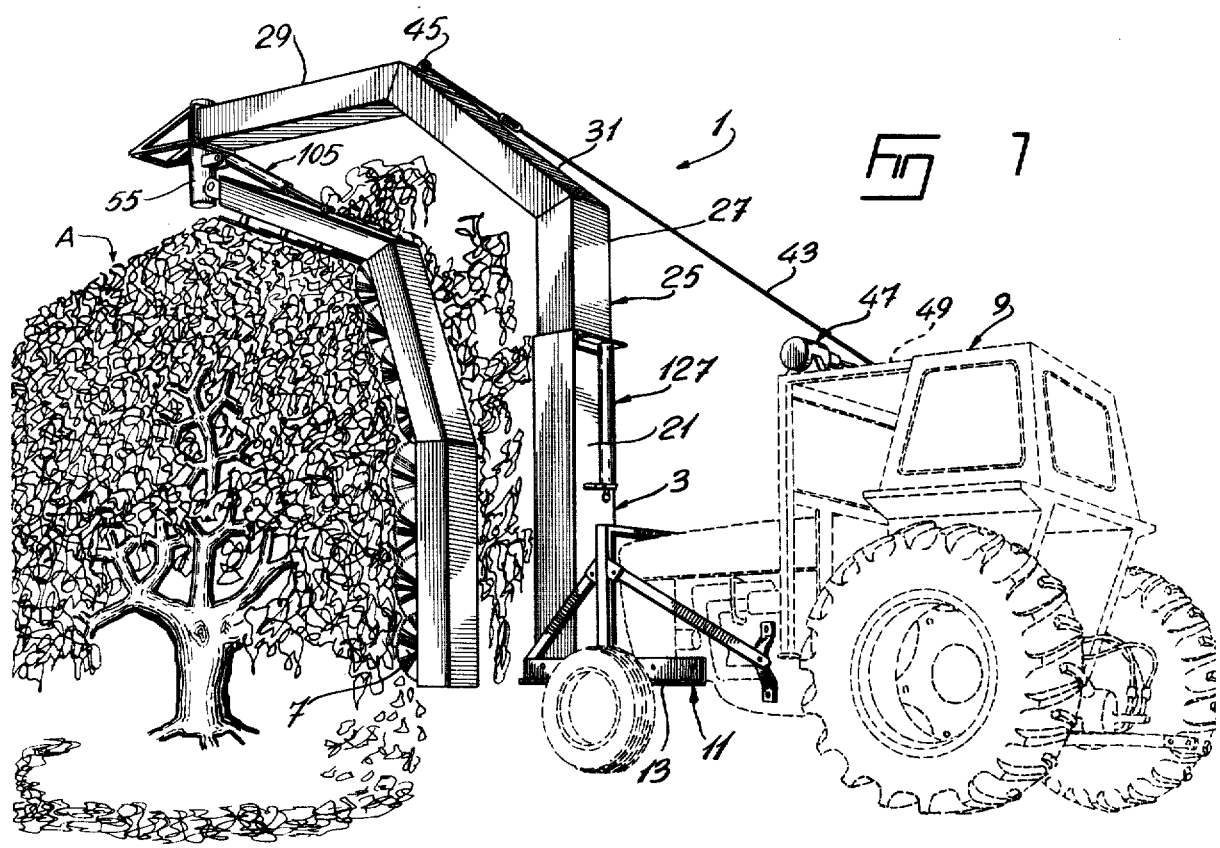
FIG. 1 is a perspective view of a tree trimmer made according to the present invention, being shown in operation.
Figure 2:
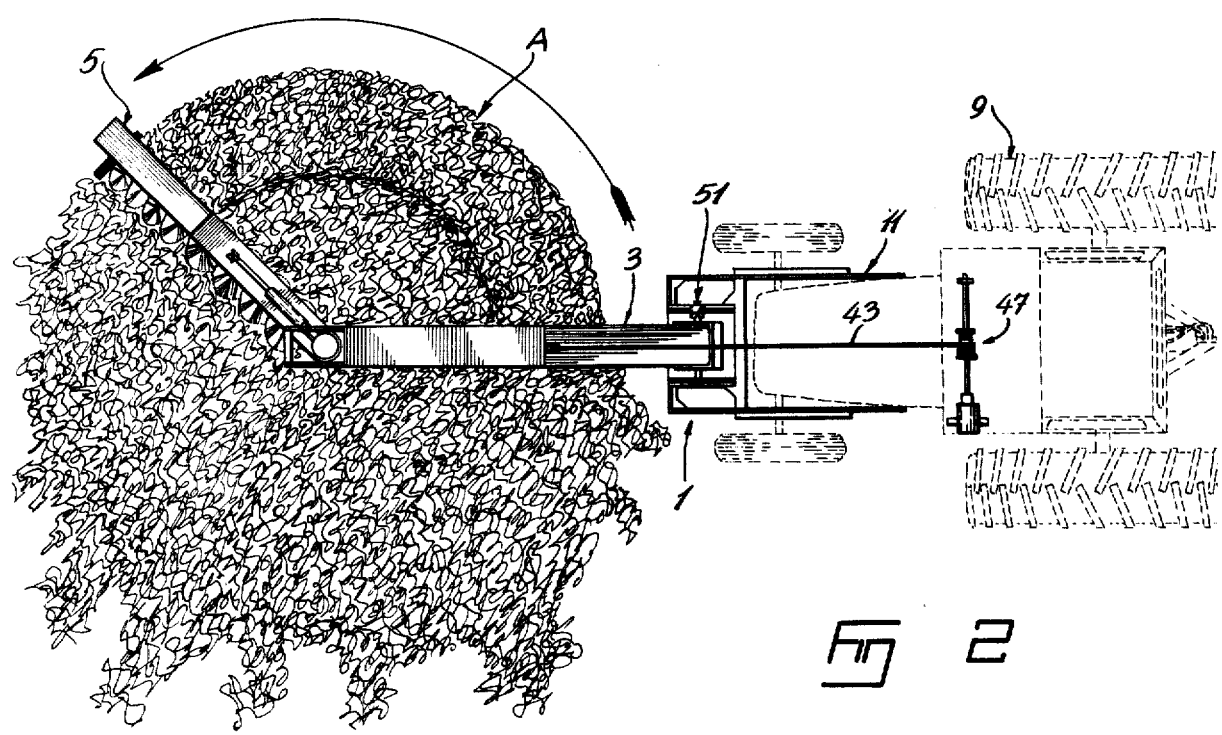
FIG. 2 is a plan view of the tree trimmer in operation.

The tree trimmer 1 of the present invention, for trimming trees, large shrubs, bushes or the like, basically comprises support means 3, a cutter arm 5 suspended from the support means, and cutting means 7 on the cutter arm, as shown in FIGS. 1 and 2.

Figure 5:
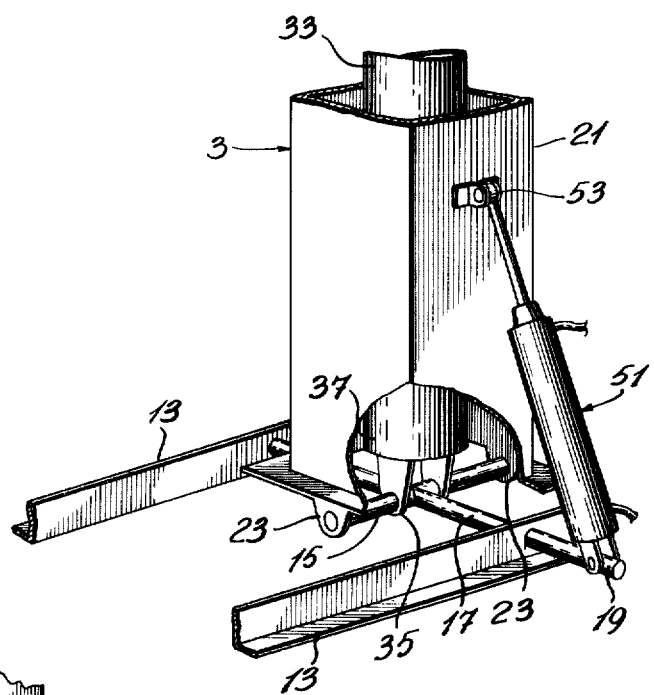
FIG. 5 is a detail view, in partial section, of the lower end of the support arm.

The trimmer 1 of the present invention is preferably adapted to be mounted on, and operated from, a standard farm tractor 9, as shown. To this end, a suitably braced mounting frame 11 is attached to the front end of the tractor. The frame 11 includes a pair of parallel, horizontal main frame members 13, 13. The support means 3 is carried by frame members 13, 13. More specifically, as shown in FIG. 5, the bottom end of the support means 3 is pivotally mounted on a horizontal pin 15, which pin is substantially parallel with the frame members 13, 13. The pin 15 in turn is attached to another horizontal pin 17 extending transverse to pin 15 and members 13, 13. Pin 17 is rotatably mounted in members 13, 13 and has an extension 19 on one side for a purpose which will be described later. The mounting of the support means 3 to the frame 11 by the cross pins allows the support means 3 to pivot from side to side or to pivot front and back, or both.

The support means 3 has an upright sleeve 21 at its bottom end. The sleeve 21 carries flanges 23 by which the support means 3 is pivotally connected to pin 15. Telescopically mounted in the sleeve 21 is an arm 25 having a lower vertical section 27 which slides into sleeve 21 and a cantilevered section 29 extending substantially horizontally. The sections 27, 29 are connected by an angled middle section 31. All three sections, as well as sleeve 21, preferably have a rectilinear cross-section.

The arm 25 is supported in sleeve 21 by an hydraulic actuator 33. The actuator 33 is provided with ears 35 at its lower end 37 through which it is rotatably mounted on pin 15. Through its rod 39 and at its upper end, the actuator 33 is connected to a pin 41 which in turn is mounted in the wall of lower section 27 of arm 25. The actuator 33 is preferably designed so that in its at-rest position, it supports the arm 25 at its minimum height position. Operation of the actuator 33 will raise the arm 25 vertically as shown in FIG. 4.

The support means 3 can be rocked forward and backward, as shown in FIG. 7, by means of a cable 43, attached at one end to an eye bracket 45 on section 31 of arm 25, and attached at the other end to a winch mechanism 47 mounted on top of the cab 49 of the tractor or on other suitable frame means. The support means 3 pivots about pin 17 as the cable 43 is wound or unwound.

The support means 3 can also be moved from side to side, as shown in FIG. 8. Hydraulic actuator such as jack 51, is provided for this purpose, mounted on one side of support means 3. As shown in FIG. 5, the actuator means 51 is pivotally mounted at one end to the pin extension 19 at its other end to a bracket 53 on a side wall of sleeve 21. Operation of the jack 51 moves the support means 3 to either side depending on how the jack 51 is operated.

The cutting arm 5 is suspended from the free end of cantilevered arm 25 by a vertical stub shaft 55, as shown in FIG. 3. The stub shaft 55 is mounted on the end of section 29 by bearings 57, 59. The cutting arm 5 has a bracket 61 at its upper end. A bracket 63 is fixed to the lower end of shaft 55. The brackets 61, 63 are joined by a bolt 65. Jack support means 105 hold the arm 5 in position as will be described later.

The shaft 55, and thus the cutting arm 5 connected to it, is rotated about a substantially vertical axis by a hydraulic motor 67 mounted within section 29 of arm 25. The motor 67 operates a gear 69 which in turn operates a meshing gear 71 fixed to shaft 55.

Figure 6:
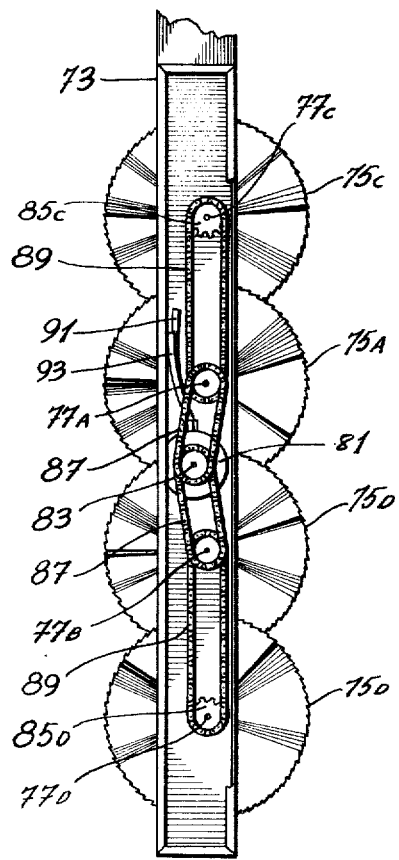
FIG. 6 is a detail view, in partial section of a portion of the cutter arm.

As the cutting arm 5 is rotated, the cutting means 7 are operated to trim a tree to a desired shape. This desired shape is dictated by the arrangement of the cutting means 7 and the shape of arm 5. The arm 5 is laterally offset from shaft 55 and generally extends outwardly and downwardly from shaft 55. The arm 5 can be curved, or, as shown in the drawings, made in three straight sections 73, angularly joined together. The sections 73 carry cutting means 7. The cutting means 7 preferably comprise a group of rotary saws 75. As shown, each group comprises four rotary saws 75 but more saws could be employed in each group. The rotary saws 75 overlap each other slightly and are thus staggered in height to permit the overlap. Preferably, the saws 75 in each group decrease in height in a direction toward the group as shown in FIG. 4. Each saw 75 is mounted on a shaft 77 rotatably mounted in a section 73 and extends out from its inner surface or wall 79. A motor 81 is mounted in the center of section 73 with two saws 75, in each group, on either side. The motor 81 has a drive shaft 83 carrying a pair of drive sprockets. The two saws 75A, 75B nearest the motor, each have two sprockets on their shafts 77A, 77B. The two saws 75C, 75D farthest away, each have one sprocket 85C, 85D on their shafts 77C, 77D. As shown in FIGS. 3 and 6, first chains 87 extend from each sprocket on drive shaft 83 to a sprocket on shafts 77A, 77B. Second chains 89 extend from the second sprocket on shafts 77A, 77B to sprockets 85C, 85D on shafts 77C, 77D. The chain and sprocket drives are so arranged that the motor 81 in each section 73 drive all the rotary saws 75 in the same direction. This direction is preferably clockwise, viewing FIG. 1, as the cutting arm 5 is rotated counterclockwise viewing the same FIG. 1. This ensures directing the cut parts toward the ground.

The motors 81 are preferably hydraulic motors. Inlet and outlet hydraulic fluid lines 91, 93 connect the motors 81 in series. Lines 91, 93 are connected with lines 91', 93' in arm 25, by circular channels 95, 97 respectively provided in a collar 99 fixedly mounted about shaft 55 and channels 101, 103 in shaft 55. The circular channels 95, 97 in collar 99 permit hydraulic fluid to be supplied to operate motors 81 even while cutter arm 5 rotates.

Means 105 are provided for supporting cutter arm 5 relative to shaft 55. This means also raises arm 5 about bolt 65 if desired, as shown in FIG. 4. The means 105 shown comprise a hydraulic actuator jack 107 connected at one end 109 by a bolt 111 to a bracket 113 on shaft 55. The rod end 115 is connected by a bolt 117 to a bracket 119 on the top or outer surface or wall of the first section 73 of the arm 5. A single hydraulic line 121 is connected to hydraulic actuator 107. The line 121 is connected to a supply line 121' in arm 25 by a circular channel 123 in collar 99 and a channel 125 in shaft 55. With the hydraulic means 107 inactive, the cutter arm 5 will be in its lowest position. Means 107, when actuated, will cause arm 5 to pivot upward about bolt 65, thus swinging the lower sections 73 outwardly. This permits control of the diameter to which a tree is to be trimmed.

The sleeve 21 of support means 3 may carry a levelling mechanism 127 on the wall facing the cab 49. This mechanism 127 can comprise a pendulum weight to assist the trimmer operator, sitting in the cab to position the support arm in a substantially vertical plane.

In operation, the operator drives the tractor, carrying the trimmer 1, up to a tree "A", such as an apple tree in an orchard, which is to be trimmed. The tractor is positioned so as to locate shaft 55 substantially centrally of the tree to be trimmed. Hydraulic controls (not shown) are operated in the cab to operate the hydraulic means 51 to tilt the support means 3 in either direction so it is substantially vertical, even if the tractor is on uneven ground. This positioning is shown in FIG. 8. The hydraulic controls are then operated to lower the support arm 25 via hydraulic means 33 until it is at the proper height in relation to the top of the tree. Hydraulic means 105 can then be operated by the controls to swing cutter arm 5 upwardly and outwardly until a position is obtained which, on rotation of arm 5, will generate a desired tree shape. The desired tree shape can also be obtained by operating winch 47 to swing support arm 25 up or down about pin 17. This movement of arm 25 can be done together with the swinging of arm 5 by hydraulic means 105. Once the cutting arm 5 has been properly located in relation to the tree to be trimmed, the controls are actuated to operate rotary saws 75, through motors 81 and also to rotate cutter arm 5 about the substantially vertical axis of shaft 55 by motor 67. In one revolution of the arm 5, the tree is trimmed.

The hydraulic actuators 33, 51 and 105 are hydraulic cylinders with projecting piston rods, as are well known. The hydraulic fluid for the actuators 33, 51, 105; motors 67 and 81; and winch mechanism 47 if necessary, can be supplied from suitable means on the tractor, as is also well known. Motive power other than hydraulic could also be employed. The lines supplying power extend up through the preferably hollow support means 3.

I claim:

1. A tree trimmer for trimming a tree from the top center down to the lower lateral edge thereof, said trimmer comprising:
   a. a support arm, stationary in operation of said trimmer, having a generally upright section and a bent section extending away from said upright section so that its outer end, in operation of said trimmer, reaches out to said top center;
   b. a rotary cutter arm having an upper end which, in operation of said trimmer, stands at said top center; said cutter arm having a shape, from said upper end, corresponding to the outer linear contour to be given said tree from said top center down to said lower lateral edge;
   c. means mounting said upper end of said cutter arm to said outer end of said support arm for rotation of said cutter arm about a vertical axis extending transversely of said cutter arm;
   d. means holding said cutter arm, with respect to said support arm, in a position wherein it follows said linear contour, and
   e. cutting means along said cutter arm to chip limbs of said tree that project past said linear contour.

2. A trimmer as claimed in claim 1, wherein said means mounting said cutter arm to said support arm comprises: a vertical stub shaft projecting down from the outer end of said support arm and pivot means connecting said upper end of said cutter arm to said stub shaft for pivotal movement of said cutter arm about a horizontal axis.

3. A trimmer as claimed in claim 2, comprising means mounting said stub shaft for rotation on said support arm and motor means on said support arm for so rotating said stub shaft.

4. A trimmer as claimed in claim 3, wherein said holding means is a length-adjustable jack connected respectively to said cutter arm and to said stub shaft to cause, when actuated, pivoting of said cutter arm about said horizontal axis.

5. A trimmer as claimed in claim 4, including a base for said support arm; means mounting the lower end of said support arm on said base for oscillation of said support arm about two orthogonal coplanar horizontal axes, respectively, and means on said base so to oscillate said support arm.

6. A trimmer as claimed in claim 5, wherein said base is a wheeled vehicle.

7. A trimmer as claimed in claim 4, wherein said upright section of said support arm is made of a pair of telescoping members of which one is part of said bent section and means vertically to displace said one of said members.

8. A trimmer as claimed in claim 4, wherein said cutting means comprises a plurality of rotary saws distributed linearly along said cutter arm and overlapping slightly along the peripheral edges thereof, and means, on said cutter arm, to drive said saws in rotation.

* * * * *